L. A. WHEELING.
GATE.
APPLICATION FILED JULY 19, 1909.
969,925.
Patented Sept. 13, 1910.
2 SHEETS—SHEET 1.
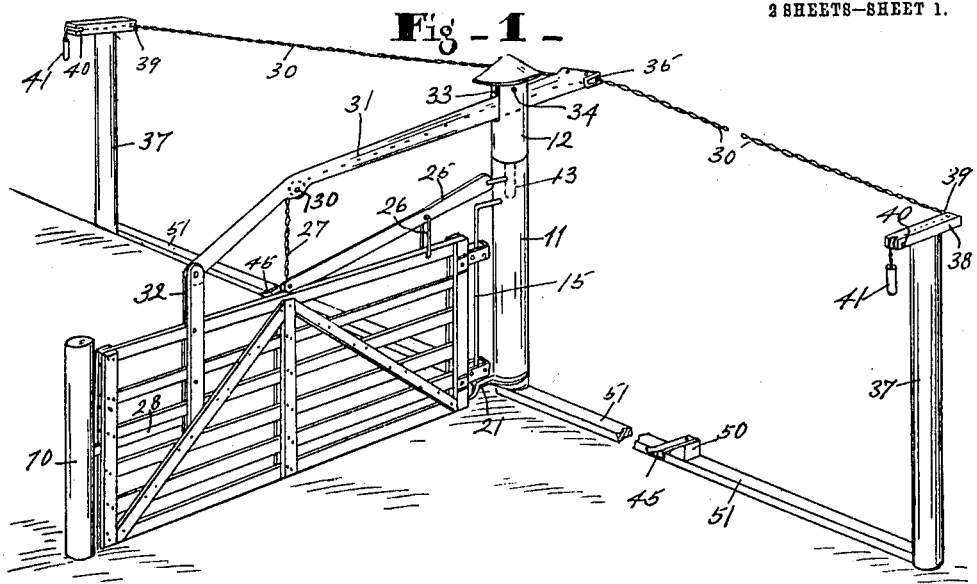
Fig-1-
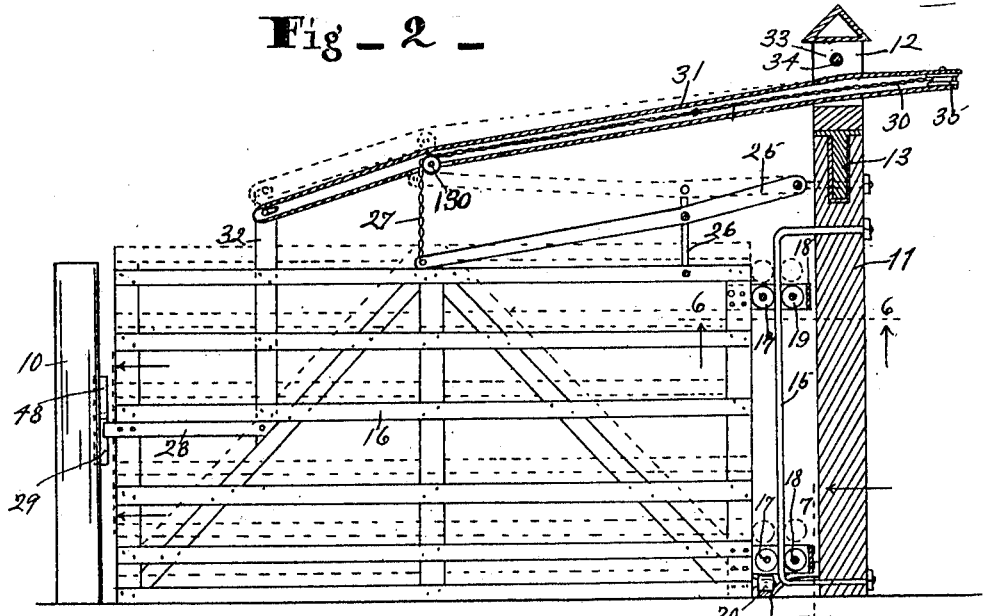
Fig-2-
Fig-3-
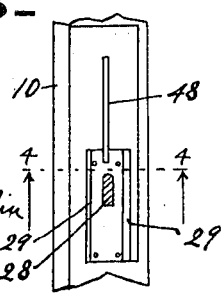
Fig-4-
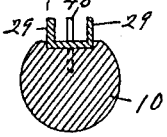
WITNESSES:
W. M. Gentle
O. M. McLaughlin
INVENTOR.
Landa A. Wheeling.
BY
V. H. Lockwood.
ATTORNEY.

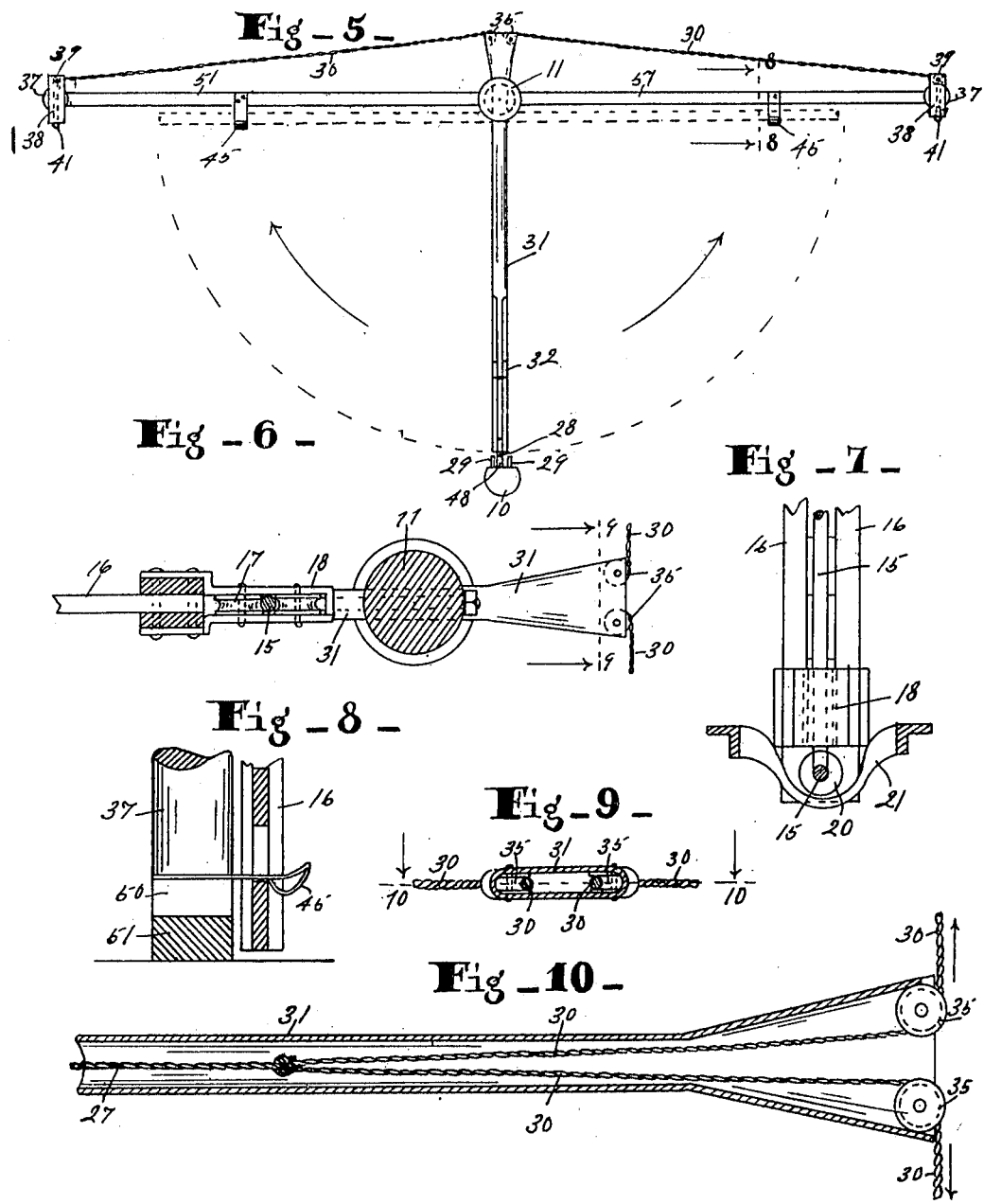

UNITED STATES PATENT OFFICE.

LANDA A. WHEELING, OF WHITELAND, INDIANA, ASSIGNOR OF ONE-HALF TO RUFUS W. TERHUNE, OF WHITELAND, INDIANA.

GATE.

969,925. Specification of Letters Patent. Patented Sept. 13, 1910.

Application filed July 19, 1909. Serial No. 508,487.

*To all whom it may concern:*

Be it known that I, LANDA A. WHEELING, of Whiteland, county of Johnson, and State of Indiana, have invented a certain new and useful Gate; and I do hereby declare that the following is a full, clear, and exact description thereof, reference being had to the accompanying drawings, in which like letters refer to like parts.
The object of this invention is to provide an improved construction of farm gate which can be opened and closed at a distance from the gate and as one approaches or leaves the gate.
The chief feature of the invention consists in pivotally mounting the rear end of the gate so that it will be vertically slidable, and in providing means for lifting the gate and disengaging it from the latch and swinging the gate around. The same cable that lifts the gate and releases it from the latch also at the same time swings the gate around. To that end a lever is connected with the rear gate post, which between its ends is connected with the upper part of the gate and at its forward end is connected with the cable, and said gate is mounted in connection with a supporting means secured to the upper part of the gate and oscillatable on the rear gate post.

Another feature of the invention consists in providing a latch adapted for use in gates where the forward end thereof is elevated for opening and lowered for closing.
In the drawings Figure 1 is a perspective view of the gate closed. Fig. 2 is a side elevation thereof with a post and some other parts in central vertical section. Fig. 3 is an elevation of the catch on the front gate post. Fig. 4 is a section on the line 4—4 of Fig. 3. Fig. 5 is a plan view showing the gate closed in full lines and opened in dotted lines. Fig. 6 is a section on the line 6—6 of Fig. 2. Fig. 7 is a vertical section on the line 7—7 of Fig. 2. Fig. 8 is a detail showing the means for holding the gate open, parts being broken away. Fig. 9 is a vertical section on the line 9—9 of Fig. 6. Fig. 10 is a horizontal section on the line 10—10 of Fig. 9.

The drawings herein show a front gate post 10 and rear gate post 11, and upon the latter there is a rotatable portion 12 having a pin 13, shown by dotted lines in Fig. 1, that fits in a corresponding socket at the top of the post 11. Upon the rear gate post there is a vertical pivot rod 15 rigidly secured and extending from the top to the bottom and spaced some distance from the post.

The gate 16 may be made in any desired form and is mounted in connection with the pivot rod 15 by pairs of grooved rollers 17, one pair at the top and one pair at the bottom and the rollers in each pair oppositely engaging the rod 15 so that they can run up or down thereon. These rollers are in brackets 18 extending rearwardly and horizontally from the rear end of the gate. At the lower end of the gate there is also a vertically disposed roller 20 that fits in a socket plate 21 secured to the gate post. It rests in said socket when the gate is closed, but when the gate is opened the roller is lifted above the socket. This manner of mounting the gate permits it to be turned outwardly and lifted or lowered and in all its movements be maintained in a horizontal position.

To the upper part of the rear post 11 a lifting lever 25 is pivoted at its rear end and between its ends there is a link 26 connecting it with the top of the gate not far from the rear end thereof. A cable 27 is secured to the front end of said lever for lifting it and when the lever is lifted, it and the gate are moved to the dotted line position shown in Fig. 2. This releases the latch 28 from the side catches 29 on the front post and enables the gate to be moved laterally. The cable 27 runs over a pulley 130 on the bar 31 that is secured at its front end to the upper end of the bars 32 fastened at the forward part of the gate, and it extends through a slot 33 of the turning post 12 of the rear gate post and is pivoted thereto on the pins 34. This bar 31 is hollow for the cable 27 to extend therethrough from the pulley 130 to the rear end, as appears in Fig. 2. It extends rearwardly a short distance beyond the rear gate post 11, as shown in Fig. 5, and is widened at its rear end, as shown in Fig. 10, and within the widened portion there are pulleys 35 mounted, one at each side over which divided members of the cable 30 extend, said cables being extended therefrom at right angles to said lever 31 and in opposite directions to posts 37, which are located at some distance away from the post 11. Upon each post 37 there is a top plate 38 having a horizontally disposed pulley 39 and a vertically disposed pulley 40, over which the cable passes, and to the extreme end of the cable there is a handle 41 whereby the cable can be drawn downwardly by a person approaching or leaving the gate.

When one of the cables 30 at either side of the gate is pulled, the gate is lifted to the dotted line position shown in Fig. 2, which elevates the latch 28 above the side catch plates 29 and permits the gate to be swung by the lever 31 in a direction away from the position of the person pulling down on the handle 41 of the cable, so the cable 30 not only elevates the gate but after being elevated and the latch released, it and the lever 31 throw the gate around. The gate is held in its open position by a spring catch 45 on the lock 50 secured on a board 51 extending from post 11 to the post 37. The catch 41 engages the lower bar of the gate, as shown in Fig. 8, but said catch is rounded, as seen in Fig. 8, so as to permit the gate to escape from the catch 45 for closing the gate. In closing the gate after one has driven through, the handle 41 on the cable at the other side of the gate is pulled, which reverses the swing of the lever 31 and throws the gate from the open to the closed position. As the gate swings shut the latch 28 strikes the vertical plate 48 on the post 10. That stops the gate in proper alinement and then when the handle 41 of the cable 30 is released, the gate drops by gravity, so that the catch 28 rests, as shown in Fig. 3, between the two catch plates 29, as it is obvious from an examination of Fig. 3 that the latch 28 will escape from the catch plate on the side of the plate 48 to which the gate is initially swung by the pull on the cable 30. If the gate is to be swung to the right of the front gate post looking at it from a standpoint of Fig. 3, the latch 28 will move from the position there shown to the right of the plate 29. If the gate is to be swung to the left it will escape to the left of the plate 48. The plate 48 is merely a stop plate to stop the closing movement of the gate and so that when the gate settles, the latch 28 will be below the plate 48 and enable it to pass to the side of the plate 48 when the gate is to be opened toward that side.

What I claim as my invention and desire to secure by Letters Patent is:

1. The combination of a gate post, a gate pivoted therewith so as to be vertically movable and horizontally oscillatable, a lever pivoted at one end to said gate post and projecting over the gate, a connection between the gate and said lever intermediate its ends, a cable connected with said lever, and means above the gate and laterally oscillatable on the gate post over which said cable extends for elevating and lowering the gate.

2. The combination of a gate post, a gate pivoted therewith so as to be vertically movable and horizontally oscillatable, a lever pivoted at one end to said gate post and projecting over the gate, a connection between the gate and said lever intermediate its ends, a bar pivotally mounted on said gate post and extending over said lever and gate and at its forward end pivotally connected to the top of the gate, and flexible means connected at the forward end of said lever and passing vertically therefrom over a pulley on said bar and thence along said bar to the rear end thereof.

3. The combination of a gate post, a gate, vertical means secured to the gate post on which the rear end of the gate is vertically movable and horizontally oscillatable, a lever pivoted at one end to the gate post and projecting forwardly over the gate, a connection with the gate located between the ends of said lever, a horizontally rotary bearing piece on the upper end of said gate post, a hollow bar pivoted between its ends in said bearing piece so as to be vertically oscillatory and projecting over the gate and pivoted at its front end to the gate, a pulley on said bar between the bearing piece and the connection with the gate, and flexible means connected to the forward end of said lever and running over said pulley and rearwardly through said bar.

4. The combination of a gate post, a gate pivoted therewith so as to be vertically movable and horizontally oscillatable, a lever pivoted at one end to said gate post and projecting over the gate, a connection between the gate and said lever intermediate its ends, a bar pivotally mounted in connection with said gate post so as to be both vertically and horizontally oscillatory and longitudinally movable and extending over said lever and gate and at its forward end pivotally connected with the top of the gate, and flexible means connected at the forward end of said lever and passing vertically therefrom over a pulley on said bar and thence along said bar to the rear end thereof.

In witness whereof, I have hereunto affixed my signature in the presence of the witnesses herein named.

LANDA A. WHEELING.

Witnesses:
D. L. Wheeling,
R. W. Terhune.